Feb. 13, 1951    G. V. WOODLING    2,541,141
THREADED CONTRACTIBLE RING SLEEVE
Filed March 1, 1949

INVENTOR.
George V. Woodling

Patented Feb. 13, 1951

2,541,141

UNITED STATES PATENT OFFICE 2,541,141

THREADED CONTRACTIBLE RING SLEEVE

George V. Woodling, Cleveland, Ohio

Application March 1, 1949, Serial No. 78,989

2 Claims. (Cl. 285—166)

My invention relates to couplings and more particularly to couplings of the non-flare type having a contractible sleeve for engaging a cylindrical body or a tube.

This application is a continuation-in-part of my pending application, Serial No. 755,833 filed June 20, 1947, now Patent No. 2,472,872, for Flareless Tube Coupling.

An object of my invention is to provide a sleeve having an internal annular rib disposed at the leading marginal end thereof, in which the leading end of the sleeve including the rib may be cammed or deflected inwardly against the cylindrical body or tube and in which the leading end of the sleeve, including the rib, springs back away from the cylindrical body or tube when the camming action is released.

Another object of my invention is to provide a contractible sleeve with threads for threadably engaging a connection body to cam the forward end of the sleeve inwardly against a cylindrical body or tube, said forward end of the sleeve springing back when said camming action is released.

Another object of my invention is to provide a contractible sleeve with a threaded portion, the gripping action of the sleeve being such that the sleeve may be turned about the tube both for the gripping action as well as for the releasing action without breaking the threaded portion from the part of sleeve which has been cammed against the cylindrical body or tube.

Another object of my invention is the provision of a threaded contractible sleeve which may be turned about a tube without twisting the tube.

Another object of my invention is the provision of a contractible sleeve which remains resiliently alive, whereby it springs back when the contractible camming action is released.

Another object of my invention is to prevent the sleeve from shearing or "plowing" up an annular ridge of appreciable size around the tube in advance of the leading end of the sleeve by permitting the tube to longitudinally move along with the sleeve as it contracted about the tube.

Other objects and a fuller understanding of my invention may be had by referring to the following description and claims, taken in combination with the accompanying drawing, in which:

Figure 1:
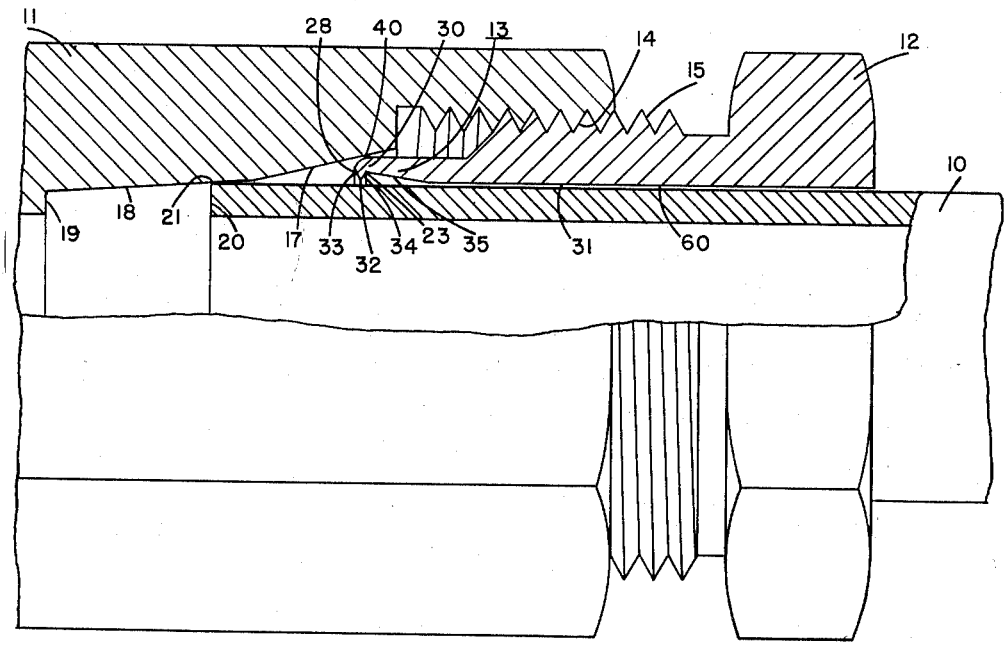
Figure 1 is an enlarged side view of a tube coupling embodying the features of my invention, the upper part being shown in section to illustrate the relationship of the parts prior to the time that the nut is tightened.

With reference to Figure 1 of the drawing, my invention comprises generally a coupling or connection body 11, a coupling sleeve nut 12 having a forward contractible end portion 13 adapted to contractibly engage a tube 10.

The coupling body 11 is provided at its right-hand end with female threads 14 which are adapted to be threadably engaged by male threads 15 provided on the sleeve nut 12 for pressing the forward end 13 into engagement with the tube. As illustrated, the coupling body 11 is provided with a first entrance flare 17 and a second entrance flare 18 to receive the tube. The second entrance flare 18 comprises a counterbore having an annular tapered wall section with a very small taper in the order of 1 or 3 degrees into which the end of the tube is wedgingly received to provide a tube seal with the coupling body. The first entrance flare 17 has an annular tapered wall section and extends outwardly toward the female threads 14 of the coupling body from the counterbore 18. The taper of the first entrance flare 17 may be in the order of 10 to 12 degrees measured with respect to the longitudinal axis of the tube.

The sleeve is preferably constructed of alloy steel, alloy brass or other metal capable of being hardenable throughout its entire mass to both a resiliency and a hardness value greater than that of the tube. For a steel sleeve, I find that steel known as 4140, heat treated throughout its entire mass and tempered to a hardness value of approximately 40 to 48 Rockwell, is satisfactory. For a brass sleeve, used principally for copper tubing, the sleeve may be made of high tensile strength alloy brass which has both a resiliency and hardness value greater than that of the tube.

The forward end 13 of the sleeve nut comprises a continuous annular body and has a leading end 28. The leading end 28 is provided with an internal annular rib 30 which has first and second converging side walls 33 and 34 that meet to define an annular edge 32 which is adapted to be embedded into the tube when the sleeve is pressed into the first entrance flare 17 by turning the sleeve nut 12. The first side wall 33 constitutes a part of the leading end of the sleeve and merges with an outer annular cam surface 40 which constitutes the outer part of the leading end of the sleeve. On the rearward side of the rib, the sleeve is provided with an internal relief bore having a longitudinally extending wall 35 which extends rearwardly from the rib 30 and merges into a cylindrical wall 31 of the sleeve nut. The relief bore is thus defined by the second side 34 of the rib 30 and the longitudinally extending wall 35.

Figure 2:
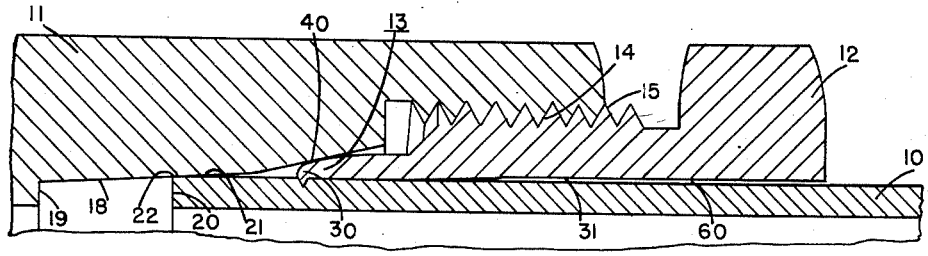
Figure 2 is a fragmentary view of Figure 1 and shows the relationship of the parts after the nut is tightened.

In operation, as the sleeve nut 12 is tightened, the outer annular cam surface 40 of the sleeve forcibly engages the tapered wall section of the first entrance flare 17 and thereby produces a camming action which cams or deflects the leading end of the sleeve against the tube. The camming action embeds the rib into the tube which resists longitudinal pull of the tube from the sleeve. Inasmuch as the end of the tube wedgingly fits within the second entrance flare 18 which is of a very slow taper, the tube is permitted to move along with the sleeve as the rib becomes imbedded into the tube. Thus, the end of the tube may move from point 21 to point 22 of Figure 2 during the tightening of the sleeve nut, the point 21 being the place where the end of the tube becomes arrested when it is manually inserted therein by the operator. The second entrance flare or counterbore 18 is sufficiently long that the end 20 of the tube never abuts against the shoulder 19 of the coupling body. Since the tube may move with the sleeve, I prevent the sleeve from shearing or "plowing up" an annular ridge of appreciable size around the tube in advance of the leading end of the sleeve. When the longitudinally extending surface 35 of the relief bore engages the tube, it functions to aid in limiting the degree to which the rib may be embedded into the tube. The sleeve has a minimum or weakened wall thickness at the junction 23 where the side wall 34 of the rib and the relief bore wall 35 meet which is located next adjacent the rearward side of the rib, whereby a hinged action is produced so that the leading end of the sleeve and the rib constitute a readily contractible portion which may be cammed or deflected inwardly against the tube notwithstanding the fact that the sleeve is constructed of hardenable alloy steel or other resilient and hard material. The wall thickness of the sleeve, beginning at the junction 23 gradually increases as advancement is made in a rearward direction toward the cylindrical wall 31 where the wall thickness becomes a maximum. The wall thickness, as it approaches a maximum, becomes sufficiently strong as to present a substantially non-contractible portion which is disposed next adjacent to and merges with the readily contractible portion at the leading end portion of the sleeve. Both the readily contractible portion and the substantially non-contractible portion are disposed to be pressed against the internal annular cam surface of the first entrance flare 17 in the order named. As the sleeve is initially pressed into the first entrance flare 17, the readily contractible portion cams or deflects inwardly against the tube for gripping the tube against longitudinal pull from the coupling body 25. As the sleeve is further pressed into the entrance flare 17, the substantially non-contractible portion resists further inward contraction of the sleeve, the resisting action limiting the amount that the sleeve may be pressed into the entrance flare 17, and thereby producing a "hit home" feeling to the tightening of the sleeve nut. The substantially non-contractible portion of the sleeve prevents the leading end or contractible portion from collapsing or inwardly buckling the wall of the tube.

The engagement of the sleeve against the tube and against the entrance flare 17 provides the main seal against high fluid pressure, as distinguished from the tube or secondary seal afforded by the end of the tube wedgingly fitting into the slow tapered bore 18. Notwithstanding the fact that the tube or secondary seal may allow the escape of fluid which is blocked or sealed by the main seal, yet the tube or secondary seal acts as a buffer to dampen high peak transient fluid shocks from effectively reaching the main seal.

In my fitting, the tube and sleeve may be repeatedly disconnected from and re-connected to the coupling body. Upon each re-connection the sleeve re-seats itself for sealing purposes as there is a certain amount of small give or yielding to the substantially non-contractible portion and the entrance flare 17. The "hit home" feeling which the operator senses upon the tightening of the sleeve nut for the initial installation or for the re-coupling installation is definite enough to indicate to the operator to cease attempting to turn the nut on any further.

The tightening of the sleeve nut does not twist the tube because the sharp rib 30 readily turns about the tube as it is cammed into the tube. The sleeve turns easily until the relief wall 35 engages the tube, at which point the rib 30 has been pressed into the tube for its full depth. Further turning of the nut beyond this point is of no purpose.

Figure 3:
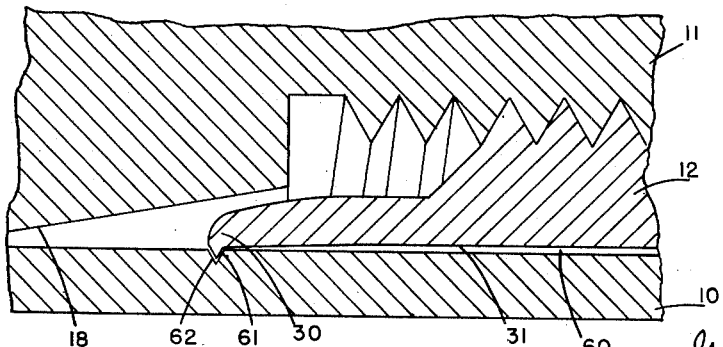
Figure 3 is a still further enlarged view of the sleeve with the sleeve unloosened, and illustrates the fact that the forward gripping end of the sleeve springs back when the camming action is released.

The sleeve nut 12 may be readily unloosened without twisting the tube, because just as soon as the camming action is released the forward end of the sleeve including the rib 30 and the relief wall 35 spring back to free the tube. The rib 30 does not spring back completely out of annular grove which it made while being cammed into the tube. The Figure 3 illustrates the general clearance between the forward end of the sleeve and the tube. The sleeve may be repeatedly disconnected from and re-connected to the coupling body. Upon each re-connection the rib 30 re-seats itself in the groove for sealing purposes. Upon each disconnection, the rib 30 and the relief wall 35 spring back to provide a small clearance with the tube, whereby the sleeve nut 12 is easily unthreaded from the connection body 11.

The views of the drawings are drawn about four and one-half times actual scale. In actual practice for a ½-inch tube, the radial depth of the internal rib 30 is approximately 15 thousandths of an inch, the maximum wall thickness at the cylindrical wall section 31 is approximately 40 thousandths of an inch, and the minimum wall thickness is approximately 25 thousandths of an inch.

A feature which marks the present sleeve is the fact that the sleeve has a resiliency and hardness value greater than that of the tube, taken in combination with the fact that the leading end section of the sleeve is physically made thin or weak enough to cam or deflect inwardly to grip the tube, and yet spring back when the camming action is released. As shown in Figure 3, which is an enlarged view, the reference character 60 designates the clearance between the inside surface of the sleeve and the outside surface of the tube. This clearance may be in the order of a few thousandths of an inch, usually between 2 to 8 thousandths of an inch, depending upon the tolerances of the tube and sleeve. When the camming action is released by backing off the nut, the rib 30 and the recessed wall 35 at the forward end of the sleeve spring back away from the tube. The amount that the forward end of the sleeve springs back away from the tube is indicated by the reference character 61 and is less than the amount that the forward end of the sleeve was originally contracted. In other words, the forward end of the sleeve does not spring all the way back to its original dimensions. The rib 30 which forms its own groove 62 in the tube remains tight within the groove when the nut is turned on tight. When the nut is released, the rib springs back but still remains partially within the groove and anchors the sleeve on the insertable member. The amount that the rib 30 springs back away from the wall of the groove and the amount that the recessed wall 35 springs back away from the tube is on the order of a few thousandths of an inch, usually between 2 to 10 thousandths of an inch. The groove may be approximately 15 thousandths of an inch deep, since it is made by the rib 30 which is approximately 15 thousandths of an inch, and thus the loosened rib remains partially in the groove. The loosened cutting edge or rib 30 has a sufficient clearance with the walls of the groove to permit relative turning to occur between the sleeve and the tube without the cutting edge resurfacing the groove upon said relative turning.

The live resiliency in the contractible ring portion at the forward end of the sleeve, which causes it to spring back when the contractible camming action is released, is of practical utility when reassembling the connection because this resiliency of the ring portion must be overcome each time that the nut is reassembled and this resilient opposition serves as an indication to the operator that the nut need not be turned very much beyond this point where the resiliency is overcome in order to effect a good sealing action of the sleeve. In other words, the overcoming of the live resiliency when retightening the nut serves to prevent the operator from excessively turning the nut, which he might otherwise do in the absence of the live resiliency.

Under conditions when the caming action is free or partly free, relative turning between the sleeve and tube may accidentally or otherwise occur in some instances during reassembly or while bending or aligning the tubing for connection. Because of irregularities, this relative turning between the sleeve and tube would normally tend to cause the rib to resurface the wall of the groove by leveling or reducing the high spots of the walls of the groove, with the result that the groove would tend to become worn or enlarged after many repeated connections, and the connection may eventually leak. With my sleeve there is substantially no resurfacing incident to this relative turning because the rib springs back and is free to turn in the groove. The action of my sleeve springing back or having live resiliency applies to sleeves having cutting edges other than that of a rib shown in the drawings and it is understood that claims drawn to this feature cover biting contractible rings of all types so long as relative turning between the sleeve and tube may occur without the cutting edge resurfacing the groove.

The live resiliency and the strength of the forward end of the sleeve prevents it from collapsing each time the nut is tightened, thus enabling the connection to be repeatedly reassembled, and each time the nut is reassembled the rib 30, as well as the recessed wall 35 takes a new set to give a good sealing action and to absorb vibration. The overcoming of the live resiliency provides the "hit home" feeling to the tightening of the nut.

Although I have described my invention with a certain degree of particularity, it is understood that the present disclosure of the preferred form has been made only by way of example and the numerous changes in the details of construction and the combination and arrangement of parts may be resorted to without departing from the spirit and the scope of the invention as hereinafter claimed.

What is claimed is:

1. A contractible sleeve provided with a bore to receive an insertable member having a substantially cylindrical outer surface, said sleeve comprising first and second portions permanently connected together, said first portion being contractible to engage the insertable member and said second portion being threaded to force the first portion and turn same in a spiral path against an internal annular cam surface of a connection body, said first portion being composed of material having both a resiliency and a hardness value greater than that of the insertable member and maintaining a live resiliency and radially springing slightly away from the insertable member upon release from the cam surface and remaining permanently connected to the second portion and turnable therewith relative to the insertable member.

2. A contractible sleeve provided with a bore to receive an insertable member having a substantially cylindrical outer surface, said sleeve comprising first and second portions permanently connected together, said first portion comprising a contractible ring having on its inner surface an inwardly projecting rib to engage and make its own groove in the insertable member and said second portion being threaded to force the contractible ring and turn same in a spiral path against an internal annular cam surface of a connection body, said contractible ring being composed of material having both a resiliency and a hardness value greater than that of the insertable member and maintaining a live resiliency and radially springing slightly away from the insertable member including the rib springing slightly away from the surface of its own groove upon release from the cam surface, said contractible ring upon release from said cam surface remaining permanently connected to the second portion and turnable therewith relative to the insertable member.

GEORGE V. WOODLING.

REFERENCES CITED

The following references are of record in the file of this patent:

UNITED STATES PATENTS

| Number | Name | Date |
| --- | --- | --- |
| 1,755,210 | Dohner | Apr. 22, 1930 |
| 2,450,314 | Vandervoort | Sept. 28, 1938 |
| 2,452,890 | Wolfram | Nov. 2, 1948 |
| 2,455,667 | Franck | Dec. 7, 1948 |
| 2,472,872 | Woodling | June 14, 1949 |